United States Patent
Tsukasaki et al.

[11] 3,970,058
[45] July 20, 1976

[54] REVOLUTION CONTROL CIRCUIT FOR INTERNAL COMBUSTION ENGINE

[75] Inventors: Hidaka Tsukasaki; Tetsuya Inoue, both of Kariya, Japan

[73] Assignee: Nippondenso Co., Ltd., Kariya, Japan

[22] Filed: Oct. 25, 1973

[21] Appl. No.: 409,458

[30] Foreign Application Priority Data
May 11, 1973 Japan................ 48-52736

[52] U.S. Cl. .................. 123/102; 123/139 E; 290/40 F
[51] Int. Cl.² .................................. F02M 39/00
[58] Field of Search............ 123/102, 32 EA, 139 E, 123/198; 290/40

[56] References Cited
UNITED STATES PATENTS

| | | |
|---|---|---|
| 3,332,406 | 7/1967 | Perry et al. ........................ 123/102 |
| 3,340,950 | 9/1967 | Hopengarten ....................... 123/102 |
| 3,719,176 | 3/1973 | Shinoda............................. 123/139 E |
| 3,789,816 | 2/1974 | Taplin................................ 123/102 |

Primary Examiner—Charles J. Myhre
Assistant Examiner—Ronald B. Cox
Attorney, Agent, or Firm—Cushman, Darby & Cushman

[57] ABSTRACT

A revolution control circuit for an internal combustion engine comprising a speed voltage generator for generating a speed voltage in accordance with the number of revolutions of the engine, an oscillator circuit which starts to oscillate when the speed voltage becomes higher than a predetermined value, a transistor circuit for causing electrical semiconductor elements to be turned on and off intermittently in accordance with the oscillation frequency of the oscillator circuit, and a control element for increasing and decreasing the quantity of fuel injected in synchronism with the on and off operations of the transistor circuit.

2 Claims, 3 Drawing Figures

REVOLUTION CONTROL CIRCUIT FOR INTERNAL COMBUSTION ENGINE

BACKGROUND OF THE INVENTION

1. Field of the Invention

The present invention relates to a revolution control circuit for internal combustion engines, particularly Diesel engines, whereby when the speed of a Diesel engine exceeds its normal maximum revolutions, a control element such as the control rack of a fuel injection pump controlled by a pneumatic governor or a throttle valve for regulating the pressure in an intake manifold is forcibly actuated to reduce the quantity of fuel delivered by a fuel injection pump with a pneumatic governor and thereby to prevent the Diesel engine from operating at an excessive speed.

2. Description of the Prior Art

Heretofore known Diesel engine of the type equipped with a fuel injection pump having a pneumatic governor have a disadvantage in that if the control characteristic of the pneumatic governor changes due to variation of the atmospheric pressure, for example, the Diesel engine tends to operate at an excessive speed which causes damage to the engine.

SUMMARY OF THE INVENTION

With a view to overcoming the foregoing difficulty, it is an object of the present invention to provide a revolution control circuit for internal combustion engines which electrically detects the number of revolutions of the engine, whereby when the number of revolutions of the engine becomes higher than a predetermined value of the normal maximum revolutions, a control element such as a servomotor is actuated to reduce the quantity of fuel delivered by the fuel injection pump to prevent the overspeeding of the engine.

The circuit according to the present invention has among its remarkable advantages the fact that when the number of revolutions of an internal combustion engine exceeds a predetermined value or the maximum value of the normal revolutions, the oscillator circuit starts oscillating and at the same time its on-off ratio is varied in accordance with the degree by which the engine speed exceeds its normal maximum revolutions, thereby reducing the fuel injection quantity on an average through repetitions of increase and decrease in the quantity of fuel injected to stably prevent the engine from operating at an excessive speed.

A further remarkable advantage of the circuit of this invention is the fact that it is capable of preventing for example a hunting phenomenon in the engine which is liable to occur where the fuel injection quantity is reduced simply through the on-off control when the number of revolutions of the engine exceeds the maximum value of the normal revolutions.

A still further remarkable advantage is the use of the transistor circuit for controlling the energization of the control element, whereby the control power can be reduced to a very small value and moreover the operating frequency of the oscillator circuit can be increased to achieve a highly accurate control without the occurrence of hunting phenomenon.

DESCRIPTION OF THE PREFERRED EMBODIMENTS

Figure 1:
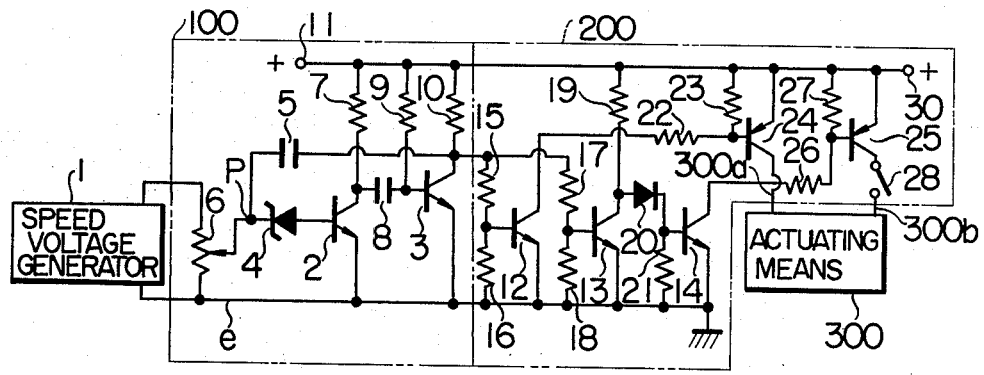
FIG. 1 is an electric wiring diagram showing an embodiment of a revolution control circuit for an internal combustion engine according to the present invention.
Figure 2:
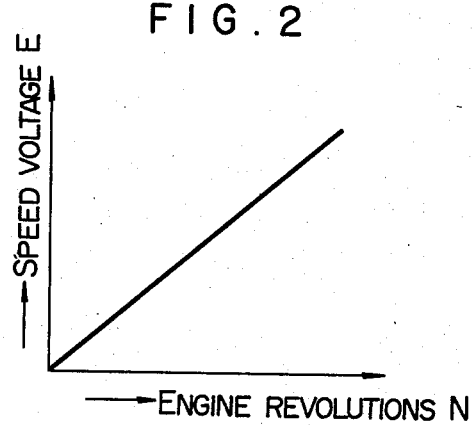
FIG. 2 is an engine revolution versus speed voltage characteristic diagram of the speed voltage generator used in the circuit of this invention.

The present invention will now be described in greater detail with reference to the illustrated embodiments. The basic circuit construction of the first embodiment shown in FIG. 1 will be described first. In FIG. 1, numeral 1 designates a speed voltage generator for generating speed voltage E corresponding to the revolutions N of a Diesel engine as shown in FIG. 2, numeral 100 an oscillator circuit, numeral 2 an error detecting transistor, numeral 3 an inverting transistor, numeral 4 a comparison Zener diode, numeral 5 a feedback capacitor, numeral 6 a revolution setting potentiometer, numerals 7, 9 and 10 resistors, numeral 8 a capacitor. Numeral 200 designates a transistor circuit, numerals 15, 16, 17, 18, 19 and 21 resistors, numeral 20 a level shifting diode, numerals 12, 13 and 14 transistors, numerals 22, 23, 26 and 27 resistors, numerals 24 and 25 actuating means controlling transistors, numeral 28 a cam switch which is opened when the control when the control rack of a fuel injection pump (not shown) reaches its normal operating position. Numeral 300 designates an actuating means constituting a control element whose one terminal 300a is connected to the collector of the actuating means controlling transistor 24 so that when the transistor 24 is rendered conductive, the control rack controlled by the pneumatic governor is forcibly moved to reduce the quantity of fuel delivered by the fuel injection pump which is not shown. The other terminal 300b of the actuating menas 300 is connected to the collector of the actuating means controlling transistor 25 through the cam switch 28 which is opened when the number of revolutions of the Diesel engine is at the normal speed, whereby the conduction of the actuating means controlling transistor 25 causes the actuating means 300 to increase the quantity of fuel delivered by the fuel injection pump. Terminals 11 and 30 are connected to the positive side of a DC power source.

With the construction described above, the operation of the embodiment shown in FIG. 1 will be described. The speed voltage generator 1 generates a DC speed voltage corresponding to the revolutions N of the Diesel engine as shown in FIG. 2. Since the voltage dividing ratio of the revolution setting potentiometer 6 is preselected so that a voltage higher than the breakdown voltage of the comparison Zener diode 4 is applied there to when the revolution of the Diesel engines become higher than the maximum value of its normal revolutions, the error detecting transistor 2 is cut off and the inverting transistor 3 is turned on when the number of revolutions of the Diesel engine is lower than the maximum value of the normal revolutions. Consequently, the transistors 12 and 13 are cut off and the transistor 14 is turned on and hence the actuating means controlling transistor 25 is also turned on. In this case, if the cam switch 28 is in the closed position, current flows to the actuating means 300 through the terminal 300b and the control rack of the fuel injection pump is moved in a direction which increases the quantity of fuel delivered by the fuel injection pump until the control rack reaches the normal operating position. When the control rack reaches the normal operating position, the cam switch 28 is opened and the operation of the actuating means 300 is stopped. Thereafter, the quantity of fuel delivered by the fuel injection pump is controlled by the pneumatic governor. Since this pneumatic governor is of the known type, its construction and operation will not be described in detail.

When the number of revolutions of the Diesel engines becomes higher than the maximum value of the normal revolutions, the speed voltage generated by the speed voltage generator 1 becomes higher and exceeds the breakdown voltage of the comparison Zener diode 4. Consequently, the base current is supplied to the error detecting transistor 2 to establish conduction state between the collector and the emitter of the transistor 2 and therefore the oscillator circuit 100 starts oscillating. At this instant, the charge previously stored in the capacitor 8 through the terminal 11, the resistor 7, the capacitor 8, the base and the emitter of the inverting transistor 3 and the ground applies a reverse bias to the inverting transistor 3. As a result, the inverting transistor 3 is cut off and the base current flows to the transistors 12 and 13 to turn them on. Further, the transistor 14 is cut off. When this occurs, current flows to the actuating means 300 through the terminal 300a owing to the conduction of the actuating means controlling transistor 24 and thus the control rack is operated in a direction which decreases the quantity of fuel delivered by the fuel injection pump. During this time interval, the capacitor 8 is charged in the reverse direction by the current flowing through the terminal 11, the resistor 9, the capacitor 8, the collector and the emitter of the error detecting transistor 2 and the ground. Consequently, the reverse bias voltage applied to the base of the inverting transistor 3 gradually decreases and eventually the state is reached where the base of the inverting transistor 3 is biased in the forward direction. At this instant, a conduction state is established between the collector and the emitter of the inverting transistor 3 with the result that current flows through the resistor 10 and the transistors 12 and 13 are cut off. At the same time, the potential at the collector of the inverting transistor 3 decreases and therefore the voltage between points p and e is decreased by the charge stored in the feedback capacitor 5 through the terminal 11, the resistor 10, the capacitor 5, the revolution setting potentiometer 6 and the ground. This interrupts the current flowing to the base of the error detecting transistor 2 by way of the comparison Zener diode 4 and consequently the error detecting transistor 2 is cut off. When this occurs, the feedback capacitor 5 is now charged in the reverse direction by the current caused by the speed voltage E produced by the speed voltage generator 1 and supplied through the collector and the emitter of the inverting transistor 3. As a result, the voltage between the points p and e rises gradually so that when this voltage again exceeds the breakdown voltage of the comparison Zener diode 4, the error detecting transistor 2 is again turned on and the inverting transistor 3 is cut off. Thereafter, the conduction and nonconduction cycles of the error detecting transistor 2 and the inverting transistor 3 are repeated in the above-mentioned manner and the transistors 2 and 3 come into oscillating action. The on-off ratio of the oscillator circuit 200 during the above-mentioned oscillating action is varied in accordance with the magnitude of the speed voltage E. In other words, the ratio between the conduction period and the nonconduction period of the inverting transistor 3 is varied in accordance with the time interval during which the feedback capacitor 5 is charged by the speed voltage E from the speed voltage generator 1 and its voltage becomes higher than the breakdown voltage of the comparison Zener diode 4, that is, the difference between the number of revolutions of the Diesel engine and the maximum value of the normal revolutions. Consequently, the conduction period of the inverting transistor 3 decreases in proportion to the degree by which the number of revolutions of the Diesel engine exceeds the maximum value of the normal revolutions. Thus, of the actuating means controlling transistors 24 and 25 for forward and backward switching purposes, the conduction period of the transistor 24 increases with the result that the effective value of the current flowing through the terminal 300a becomes greater than that of the current flowing through the terminal 300b. As a result, the actuating means 300 forcibly operates the control rack of the fuel injection pump to reduce the quantity of fuel delivered, thereby controlling the number of revolutions of the Diesel engine and thus always causing the engine to operate at speeds lower than the maximum value of the normal revolutions to prevent the overspeeding of the engine.

Next, the detailed electric circuit of another embodiment of the present invention utilizing the above-described basic circuit construction of FIG. 1 will be described with reference to FIG. 3.

Figure 3:
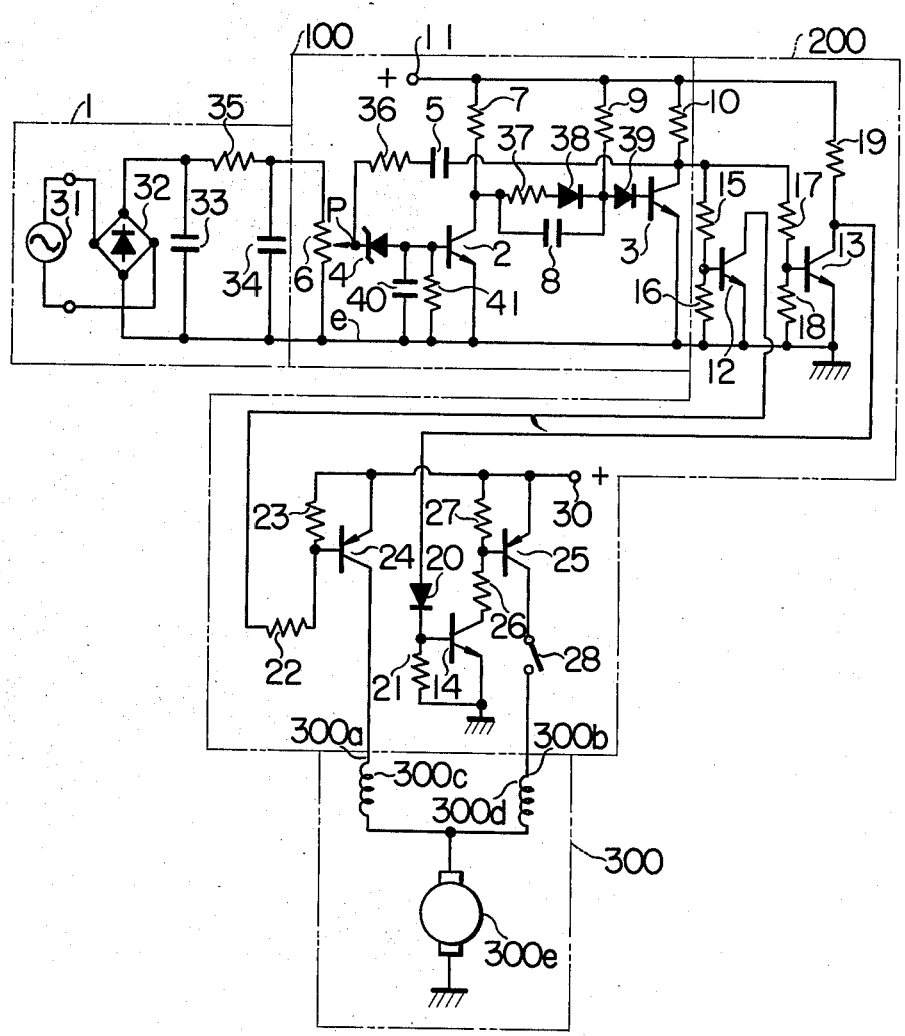
FIG. 3 is an electric wiring diagram showing another embodiment of the revolution control circuit according to the present invention.

In the embodiment shown in FIG. 3 in which the component parts designated by the identical reference numerals as used in FIG. 1 show the identical or equivalent parts, the speed voltage generator 1 comprises an AC generator 31 driven by the Diesel engine, a full-wave rectifier 32 for rectifying the AC voltage generated by the generator 31 and a smoothing circuit comprising capacitors 33 and 34 and a resistor 35 to smooth the pulsating voltage rectified by the full-wave rectifier 32. The actuating means 300 comprises a DC servomotor composed of an armature 300e and forward and reversing field coils 300d and 300c which are wound respectively in the forward and backward directions. The forward field coil 300d is connected to the terminal 300b and the reversing field coil 300c is connected to the terminal 300a, whereby the control rack of the fuel injection pump is moved to the fuel injection quantity increasing position or the fuel injection quantity decreasing position in accordance with the rotation of the armature 300e. Numeral 41 designates a bias resistor, numeral 40 a noise suppressing capacitor, numerals 36 and 37 resistors, numers 38 and 39 diodes. In this embodiment, the capacitor 40 is connected between the base and the emitter of the transistor 2 and in this way the oscillator circuit 100 may be caused to oscillate at a frequency different from that of the oscillator circuit 100 in the embodiment of FIG. 1. Further, when the feedback action of the capacitor 5 causes the potential at the point p to momentarily exceeds the maximum rated voltage between the base and the emitter of the transistor 2 and drops to a negative value, the voltage may be absorbed to protect the transistor 2.

While, in the embodiments of this invention so far described, the control rack of the fuel injection pump is operated by the actuating means 300 to control the quantity of fuel delivered and thereby to prevent the Diesel engine from overspeeding, it is possible to cause the actuating means 300 to operate a throttle valve for regulating the pressure in the intake manifold of the Diesel engine so that the pneumatic governor is operated in accordance with the pressure in the intake manifold to indirectly move the control rack of the fuel injection pump to control the fuel injection quantity and thereby to prevent the Diesel engine from operating at an excessive speed.

We claim:

1. A revolution control circuit for an internal combustion engine comprising:

a speed voltage generator for generating a speed voltage corresponding to the number of revolutions of said engine, an oscillator circuit adapted to start oscillating when said speed voltage generated by said speed voltage generator becomes higher than a predetermined value and having an on-off ratio varying in accordance with said speed voltage, a transistor circuit adapted to be turned on and off intermittently in accordance with said on-off ratio upon initiation of the oscillations of said oscillator circuit, and a control element for increasing and decreasing the quantity of fuel delivered in synchronism with the on-off operations of said transistor circuit to decrease on an average the fuel injection quantity in accordance with the degree of deviation of said speed voltage from said predetermined value, said control element including a servomotor operable in synchronism with the on-off operation of said transistor circuit and a control rack driven by the servomotor and said oscillator circuit including voltage detecting means having Zener diode for providing a signal when said speed voltage generator becomes higher than a predetermined value, a first transistor having a base circuit connected to said voltage detecting means being conductive when said voltage detecting means provides said signal, a capacitor connected to said first transistor, a second transistor having a base circuit connected across said emitter-collector circuit of said first transistor vai said capacitor, and a feedback circuit having another capacitor connected between the output of said second transistor and the input of said Zener diode.

2. A revolution control circuit for an internal combustion engine comprising:

a speed voltage generator or generating a speed voltage corresponding to the number of revolutions of said engine, an oscillator circuit adapted to start oscillating when said speed voltage generated by said speed voltage generator becomes higher than a predetermined value and having an on-off ratio varying in accordance with said speed voltage, a transistor circuit adapted to be turned on and off intermittently in accordance with said on-off ratio upon initiation of the oscillations of said oscillator circuit, and a control element for increasing and decreasing the quantity of fuel delivered in synchronism with the on-off operations of said transistor circuit to decrease on an average the fuel injection quantity in accordance with the degree of deviation of said speed voltage from said predetermined value, said control element including a servomotor operable in synchronism with the on-off operation of said transistor circuit and a control rack driven by the servo-motor and said transistor circuit including a first transistor circuit connected to said oscillation circuit for providing said control element with an electric source when the output of said oscillation circuit becomes one typical state to increase the quantity of the fuel and a second transistor circuit connected to said oscillation circuit for providing said control element with an electric source when the output of said oscillation circuit becomes the other typical state to decrease the quantity of the fuel.

* * * * *